United States Patent [19]

Brems et al.

[11] 4,351,241
[45] Sep. 28, 1982

[54] WORKPIECE STORAGE SYSTEM

[75] Inventors: John H. Brems; James T. Graham, both of Birmingham, Mich.

[73] Assignee: F. Jos. Lamb Company, Warren, Mich.; a part interest

[21] Appl. No.: 176,563

[22] Filed: Aug. 8, 1980

Related U.S. Application Data

[62] Division of Ser. No. 908,941, May 24, 1978, abandoned.

[51] Int. Cl.³ .............................................. B61B 3/00
[52] U.S. Cl. ..................................... 104/93; 188/290; 198/473; 104/89
[58] Field of Search ............... 198/339, 347, 472, 473, 198/580, 560, 648; 104/89, 93, 127, 128; 105/148, 150; 188/267, 290

[56] References Cited

U.S. PATENT DOCUMENTS

| | | | |
|---|---|---|---|
| 618,396 | 1/1899 | Cowles | 104/127 |
| 2,312,188 | 2/1943 | Patz | 105/150 |
| 2,832,298 | 4/1958 | Ambli | 105/150 |
| 4,098,375 | 7/1978 | Kornylak | 188/290 |
| 4,215,772 | 8/1980 | Graham | 188/290 |

Primary Examiner—Joseph E. Valenza
Attorney, Agent, or Firm—Barnes, Kisselle, Raisch & Choate

[57] ABSTRACT

For use in a work processing line for workpieces, a workpiece storage system including a topologically closed loop track means having downwardly sloping surfaces coupled with elevators and lowerators in the loop, and work holding, gravity-operated pallets to run on said tracks having track engaging wheels equipped with retarding means responsive to wheel angular velocity and utilizing wheels of different diameters on the track depending on the loaded or unloaded condition of the pallets to control the speed of the pallets. Auxiliary track means, pallet loaders and unloaders, and switching mechanisms are incorporated in the system with elevators and lowerators to allow the storage system to function between multiple work processing lines, between single and multiple lines or between multiple and single lines to increase the flexibility of a work processing activity and reduce downtime.

4 Claims, 21 Drawing Figures

WORKPIECE STORAGE SYSTEM

This is a division of application Ser. No. 908,941, filed May 24, 1978, entitled "Workpiece Storage System" (now abandoned).

This invention relates to a Workpiece Storage System between sections of a multiple section workpiece processing line and the further utilization of this workpiece storage system as a means of transferring workpieces between parallel transfer lines and the division and combining of workpieces on transfer lines requiring this function.

Reference is made to our copending application, Ser. No. 176,562, filed Aug. 8, 1980.

BACKGROUND

In the field of automatic machining, assembly, and other forms of workpiece processing, it is customary practice to use transfer machines which employ a multiplicity of stations which operate sequentially on a given workpiece, with a line of workpieces progressively transferred along the line of stations, by an automatic transfer mechanism.

In such a work processing line, for example, there are work holding bodies in the form of pallets which run by gravity on declining tracks with track engaging wheels.

It is an object of the present invention to provide track engaging wheels equipped with retarding means responsive to wheel angular velocity and to utilize wheels of different diameters on the track depending on the loaded or unloaded condition of the traveling bodies to control the velocity on the declining tracks.

Other objectives and features of the invention will be apparent in the following description, claims, and accompanying drawings in which the principles of operation and use are set forth in connection with the best modes presently contemplated for the practice of the invention.

DRAWINGS accompany the disclosure and the various views thereof may be briefly described as.

One basic element of this system is a pallet or workpiece holding carrier which is a means for supporting a workpiece during storage, cross-transferring, dividing, or recombining. A given pallet is unpowered but moves along a downwardly sloped track system on wheels, at least one of which is retarded by a braking system governed to maintain a controlled speed.

Figure 1:
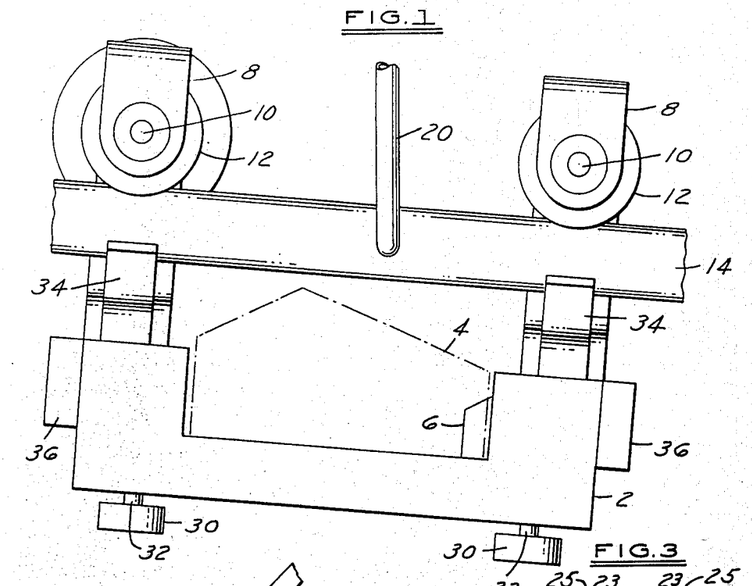
FIG. 1, a segmental view of a pallet system showing pallet and track.
Figures 2, 3, 4:
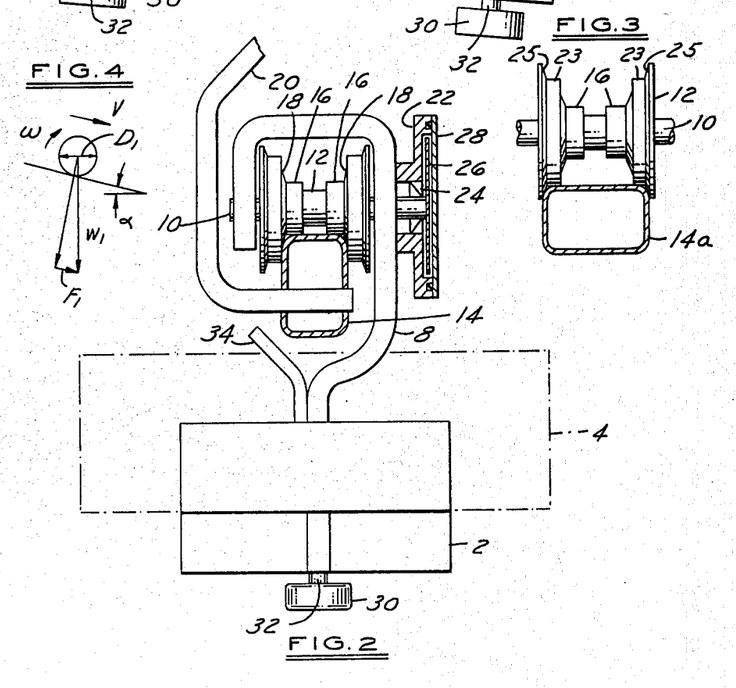
FIG. 2, an end view of the segment of FIG. 1.
FIG. 3, a view of a support roller with an alternate track relationship.
FIG. 4, a velocity force vector diagram.

A first embodiment of a pallet and a short section of supporting track is shown in FIGS. 1 and 2. A pallet frame 2 supports a workpiece 4 in a nest configuration; the workpiece 4 is transversely located by a locator 6, as part of the nest. The pallet frame 2 in turn is supported by two hangers 8 whose lower ends support the pallet frame 2, and whose upper ends are formed into an inverted U structure, in which are journalled axles 10. On each axle 10 is mounted a wheel assembly 12 designed to operate on two different rolling diameters, with each rolling diameter terminated by a pair of guiding flanges. In FIG. 2, a wheel 12 is shown rolling on a track 14 consisting of a rectangular tube with its major axis vertical; in this condition, the wheel 12 is rolling on diameters 16 and guided with respect to the track 14 by flanges 18; the track 14 is in turn supported from a suitable structure by intermittently spaced hangers, one of which is shown as hanger 20. It will be noted that pallet 2 to track 14 configuration is such that workpiece 4 is made vertically captive in the pallet 2 by the underside of the track 14; i.e., the presence of track 14 prevents the workpiece 4 from being vertically removed from its nest in pallet 2.

The axle 10 of at least one of the wheels 12 is governed as to speed of rotation by an assembly made up of a body 22 attached to the pallet hanger 8, which in turn supports a seal 24 in which is journalled the shaft 10. A retarding disc 26 is fastened to the end of shaft 10 and a sealing cover 28 is bolted to case 22. A small but controlled space exists between one face of disc 26 and case 22, and between disc 25 and cover 28. This space is filled with a viscous fluid exhibiting substantially Newtonian characteristics, such as a silicone oil. It will be understood that in such a Newtonian fluid, the shear force required to shear the fluid is directly proportional to the time rate of shear exerted on the fluid. Therefore, the retarding torque exerted on the axle 10 by the disc 26 is directly proportional to the angular velocity of the axle 10. The factor of proportionality is dependent on the viscosity of the fluid, the diameter of the disc 26 and the thickness of the fluid space on the sides of the disc.

Whereas the retarders described in connection with FIGS. 2, 5 and 46 all employed a viscous fluid operating in shear between a rotor and a housing to create a retarding torque substantially proportional to the rotor angular velocity, the well-known principle of magnet and eddy current retardation can also be utilized. As related to FIG. 2, a permanent magnet or group of them would be mounted in the cover 28 or housing 18 or both to create a magnetic field perpendicular to the plane of the disc 26 which would be made of a suitable conductor such as aluminum. Rotation of the disc 26 would induce electrical currents therein proportional to the angular velocity, which in turn would create a proportional retarding torque. A comparable design, analagous to FIG. 46, would employ a cylindrical sleeve as a rotor as opposed to a disc. In either case, because of the lower torques attainable with eddy current retardation as compared with viscous retardation, a step-up gear ratio from the wheel shaft to the retarder shaft would be advisable.

In FIG. 3 is shown the wheel track arrangement for supporting and guiding a pallet when a pallet is moving along a track empty, i.e., without carrying a workpiece. In this case, the rectangular tubular track 14a is arranged with its major axis horizontal, and the wheel 12 rolls on the track 14a on the larger diameters 23 and is guided by flanges 25. The use of different diameters of rolling on the wheels permits the independent control of speed between full and empty pallets, including, but not restricted to, having full and empty pallets descend the downward sloping tracks at substantially identical speeds. Other uses of this feature will be subsequently described.

The effect on the rolling diameter on the speed of descent may be understood by reference to FIG. 4, a schematic velocity and force vector diagram of a wheel supporting a weight $W_1$ having a diameter $D_1$, and rolling down a track inclined to the horizontal at an angle $\alpha$, and moving with an angular velocity $\omega$ and linear velocity V. It can be seen that the force, parallel to the track, causing the wheel to move forward is:

$$F_1 = W_1 \sin \alpha$$

This in turn creates a torque on the wheel $$T_F = F_1(D_1/2) = (D_1/2)W_1 \sin \alpha$$

As the wheel rolls down the track at a constant angle and substantial equilibrium is reached, i.e., the wheel is neither accelerating nor decelerating, the forward torque $T_F$ and the retarding torque $T_R$ are equal (and opposite). The retarding torque may be expressed as:

$$T_R = K_1 \omega$$

Since $\omega = V/(D_1/2)$ where V is the equilibrium velocity, $$T_R = 2K_1 V/D_1$$

Since $T_F = T_R$ $$(D_1/2)W_1 \sin \alpha = 2K_1 V/D_1$$

Solving for V $$V = (\sin \alpha/4K_1)W_1 D_1^2$$

This equation indicates that the equilibrium forward rolling velocity is proportional to the weight and the square of the rolling diameter. In the specific case where it is desired to have the rolling velocity of an empty pallet equal the rolling velocity of a full pallet, it can be seen that:

$$W_E D_E^2 = W_F D_F^2$$

where $W_E$ and $W_F$ are the empty and full weights respectively and $D_E$ and $D_F$ are the rolling diameters for the empty and full conditions respectively. This condition can be expressed also as:

$$D_E = D_F \sqrt{\frac{W_F}{W_E}}$$

The multi diameter wheel technique is also useful in other areas to be covered in the ensuing description.

Referring again to FIGS. 1 and 2, there are mounted on the bottom of the pallet, two wheels 30, free to rotate on shafts 32. These wheels 30, which operate in a horizontal plane about vertical axes, perform a variety of functions to be subsequently described.

Ordinarily, the weight of the pallet, with or without the workpiece, is maintained and guided on the track by the wheel flanges 18 or 25. As a safety against jumping the track, a bar 34 is mounted on each pallet hanger 8. This bar would contact the underside of the track 14 before the wheel flange could ride over the top of the track, due to unforeseen circumstances; the pallet assembly is therefore totally captive on the track.

Since there are many conditions in which successive pallets abut one another while moving, or when a moving pallet runs into a stationary one, suitable bumpers 36 are mounted on each end of a pallet to absorb the contact forces encountered.

An alternate wheel track arrangement is shown in FIGS. 5, 6, 7 and 8. In this embodiment, the upper end of each pallet hangers 8a is formed into an open hook 50 which engages a circular groove 52 in a package or cartridge type wheel, axle, retarder assembly. The hook is closed and made captive on the cartridge by a bolt 53 and nut 54.

Figure 5:
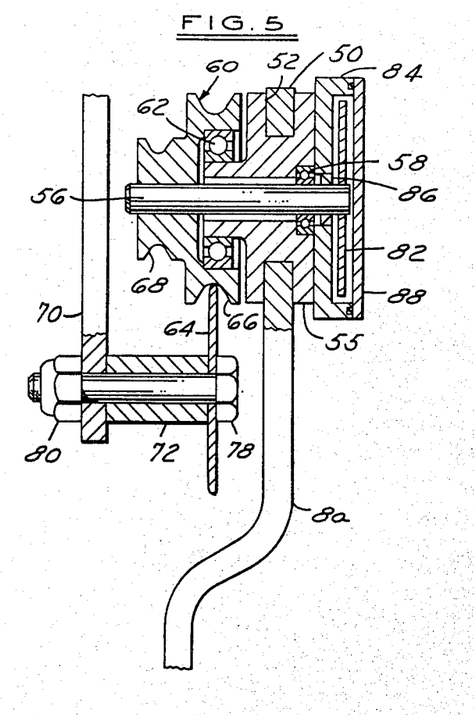
FIG. 5, a view of an alternate wheel track arrangement.

Referring to FIG. 5, the cartridge consists of a body 55 in which is journalled a shaft 56 through a bearing 58. A wheel 60 is mounted on one outboard end of shaft 56; this wheel 60 is further journalled to the outside of body 55 through bearing 62, which is the primary load carrying bearing. The outside of wheel 60 is formed into two double flanged grooves having two separate rolling diameters. In FIG. 5, the wheel 60 is shown engaging the track 64 with its larger rolling diameter 66; in FIG. 6, the wheel 60 is shown engaging the track 64 with its smaller rolling diameter 68.

The track 64 is comprised of a thin bendable ribbon of suitable material punched with holes or slots for mounting. This track is mounted from a suitable support by multiple hangers 70 through spacers 72 or 74 and bolts 76 or 78 and nuts 80. A material particularly desirable for use as a track is a high carbon, hardened steel given a chemical or heat treatment for corrosion resistance and known in the industry as "blue steel".

The retarder assembly is comparable to that shown in FIG. 2. Referring to FIG. 5, a disc 82 is fastened to and rotates with the other end of the wheel shaft 56. The retarder housing 84 is mounted coaxially to the cartridge body or made integral with it and contains a seal 86 to the shaft 56. The retarder cover 88 is fastened to the housing 84 to form a sealed cavity for the retarding fluid which fills the interspace between the two faces of the disc 82, housing 84 and cover 88, thereby creating a retarding torque on the shaft 56 which is substantially proportional to the angular velocity thereof.

Figure 6:
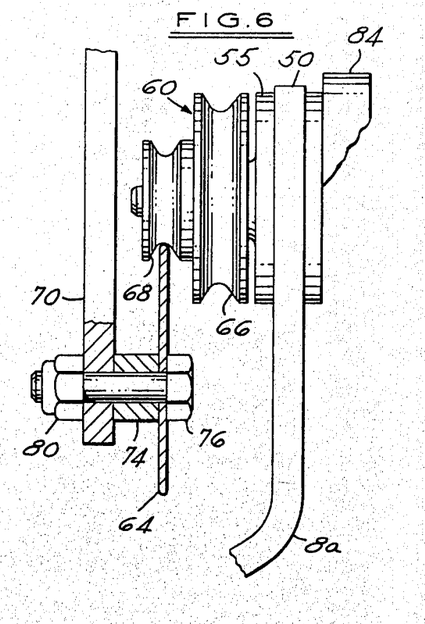
FIG. 6, a view of the wheel arrangement similar to FIG. 5 on an alternate wheel diameter.
Figure 7:
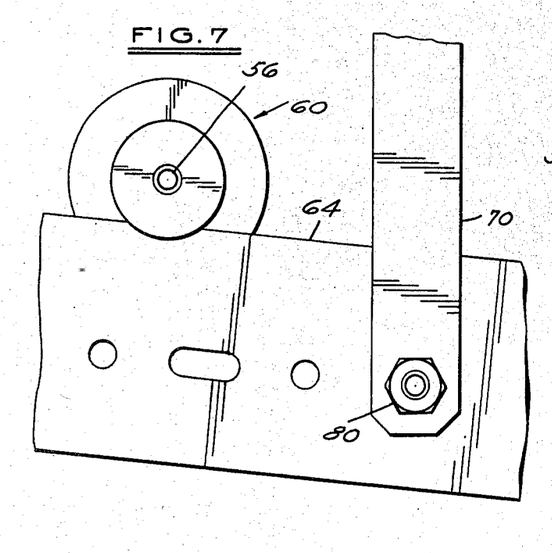
FIG. 7, a side view of the arrangement of FIG. 5.
Figure 8:
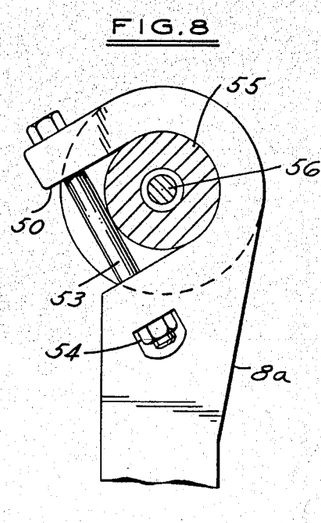
FIG. 8, a view of a hanger mounting construction.

FIGS. 7 and 8 show side views of the assemblies illustrated in FIGS. 5 and 6.

The primary means of supporting and guiding the pallets as they move through the system are the wheels 12 or 60 mounted thereon usually, but not always, with a retarder as shown in FIGS. 2 and 5. For reasons to be described, it is convenient and necessary to have the pallets move through the system part of the time by other means.

Figure 9:
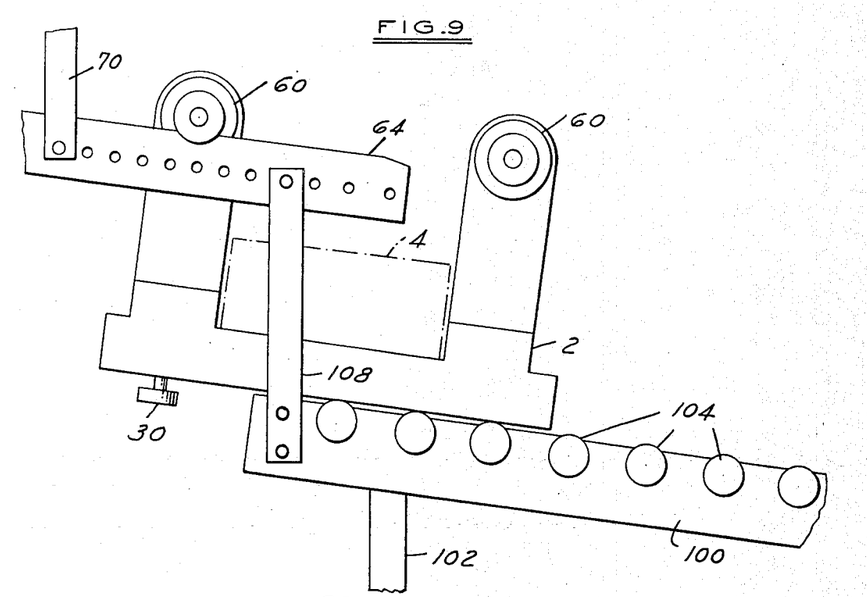
FIG. 9, a side view of an alternate roller transfer means.
Figure 10:
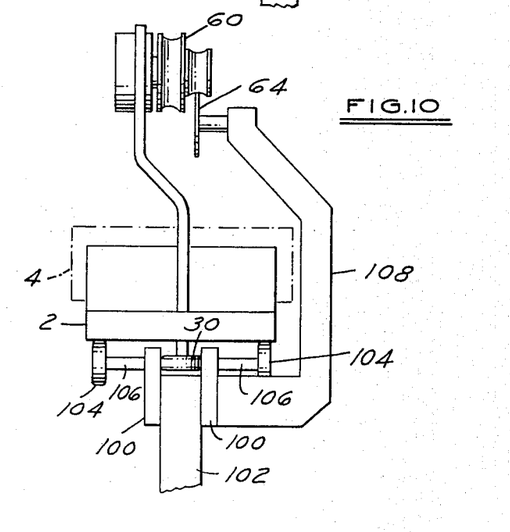
FIG. 10, an end view of the assembly in FIG. 9.

One such other means is shown in FIGS. 9 and 10. Two structural rails 100 are suitably supported by columns 102 at appropriate intervals. On these rails are mounted a series of two rows of free running rollers 104 through spacers such as 106. The upper surfaces of these rollers 104 form a nominal plane slightly above the upper surfaces of the rails 100. The inner faces of the rails 100 constitute a channel which forms a guide for the pallet mounted rollers 30 (FIGS. 1 and 2). A pallet 2 will, therefore, freely roll on and be guided by such an alternate track system.

In FIGS. 9 and 10, a pallet is shown in transition from a track system employing the stationary track 64 and pallet support wheels 60, to the support and guidance system employing stationary rollers 104 and guide rollers 30 which will be further referred to as a roller bed track. To maintain alignment between the stationary track 64 and the roller bed track, an alignment frame 108 is connected between them.

While FIG. 9 shows a pallet 2 in transition from stationary track 64 to roller bed track 100, it is clear that the inverse transition from roller bed track to stationary track 64 can be made with equal ease. The roller bed track can be curved by suitable curving of the structural rails 100, in which case the upper surfaces of the rollers generate a helical rather than a plane surface.

Figure 11:
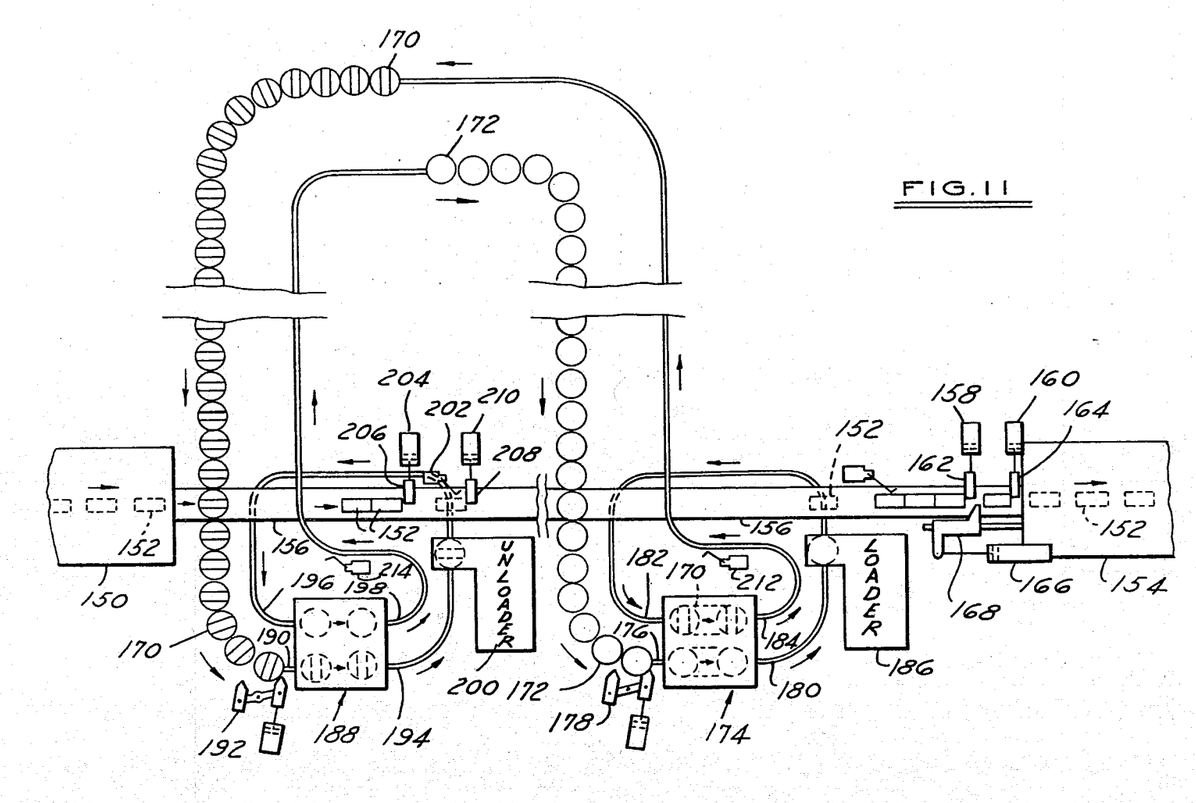
FIG. 11, a diagrammatic plan view of a storage system between two transfer line sections.

An illustrative system to accomplish workpiece storage between two sections of a transfer line is shown schematically in FIG. 11. Under normal operation, i.e., when the last section 150 of the upstream transfer line is delivering workpieces 152 and the first section 154 of the downstream transfer line is accepting workpieces 152, the flow of workpieces 152 from one section to the other is along a powered roll conveyor 156, or its equivalent, such as a walking beam conveyor, power and free conveyor or the like. As the workpieces 152 arrive at the entrance of the machine section 154, they are metered by an escapement mechanism consisting of cylinders 158 and 160 which operate gates 162 and 164 respectively. At appropriate times in the automatic cycle of machine section 154, an automatic loader, comprised of cylinder 166, and pusher 168, slides a workpiece 152 into the first station of machine section 154, from which point it is transferred through the machine section 154 by its internal transfer system. This portion of FIG. 11 is a typical and normal technique presently in use in industry.

As a convention in the representation of the storage system, all pallets which are carrying workpieces are represented by circles crossed by a double line as at 170 and referred to as full, and all pallets which are not carrying workpieces are represented by open circles 172 and referred to as empty. The storage system utilizes pallets 170 or 172, which previously have been described (pallet 2 in FIGS. 1 and 9). Dual function elevator-lowerators 174 and 188 in the storage system cooperate with a topological closed loop track system, the function of which will now be described. The elevator-lowerator 174 accepts empty pallets 172 at an upper level track 176 from an escapement 178 and delivers them to a lower level track 180, and simultaneously accepts loaded pallets 170 from a lower level track 182 and delivers them to an upper level track 184; a pallet loader mechanism 186 transfers a workpiece 152 from the conveyor 156 to a pallet on the lower level track 180–182 transforming a pallet from empty 172 to full 170; a second dual function elevator-lowerator 188 accepts full pallets 170 at an upper level track 190 from an escapement 192 and delivers them to a lower level track 194, and simultaneously accepts empty pallets 172 from a lower level track 196 and delivers them to an upper level track 198; a pallet unloader mechanism 200 transfers a workpiece 152 from a pallet on the lower level track 194–196 to the conveyor 156, thereby transforming a pallet from full 170 to empty 172; and a gating and sensing mechanism on the conveyor 156 with a limit switch 202 signals the pallet unloader mechanism 200 that an open space is available on the conveyor 156. A cylinder 204 operates a gate 206 to stop workpieces 152 on conveyor 156 during operation of pallet unloader 200, and a second gate 208 operated by cylinder 210 controls the flow of a workpiece 152 to a further downstream position on conveyor 156. Such a gating and sensing mechanism may also be employed with the pallet loader mechanism 186.

The lower level track in the topological closed loop system which operates from 180 to 182, and is associated with the pallet unloader 186, descends at a substantially uniform angle from its beginning at 180 to its ending at 182; the exit level of the empty pallet 172 from lowerator 174 is therefore appropriately higher than the entry level of the full pallet 170 into elevator 174. Similarly, the lower level track which operates from 194 to 196 has a difference in exit and entrance levels from and to the lowerator elevator 188 to generate the required descending flow.

While the lower level tracks 180–182 and 194–196 of the closed loop system are near the floor and at a specific height required by the characteristics of the pallet loader 186 and the pallet unloader 200, the two upper level tracks 184–190 and 198–176 are not as constrained. To conserve floor space, these upper level tracks 184–190 and 198–176 will be at a height above the normal passage level required by personnel, lift trucks, etc. The routings shown in FIG. 11 are for illustrative purposes only. The routings may extend over either or both of the machine sections 150 or 154, or wherever is most convenient or economical. The structural support may be from the machine sections, from floor mounted columns, from the overhead plant structure, or some combination thereof.

Full pallets 170 exit from the elevator 174 to enter the full pallet storage track, which runs from 184 to 190 with a substantially uniform descending slope, and form a queue thereon, to be released as required by escapement 192. As the lead full pallet 170 is released into the lowerator 188, the remaining full pallet queue advances one pallet length due to the slope of the track 184–190. A high level switch 212 senses when this track is fully loaded with full pallets.

Similarly, empty pallets 172 exit from the elevator 188 to enter the empty pallet storage track, which runs from 198 to 176 in a substantially uniform descending slope, and form a queue thereon to be released as required by escapement 178. As the lead empty pallet 172 is released into the lowerator 174, the remaining empty pallet queue advances one pallet length due to the slope of the track 198–176. A high level switch 214 senses when this track is full of empty pallets.

For workpieces such as cylinder heads, crankshafts, cam shafts, and comparable parts distinguished by a relatively large ratio of length to width, pallets which incorporate a hanger structure at each end to operate on a fixed overhead track through flanged retarded wheels are appropriate. For other types of workpieces, pallets which mount their own retarded support wheels, to operate on a fixed track, on the underside of said pallets are more appropriate.

In either case, and depending on workpiece size and configuration, it may be advantageous for a given pallet to locate and support two or more workpieces, with all elements of the system adapted to handle such a condition.

Figure 12:
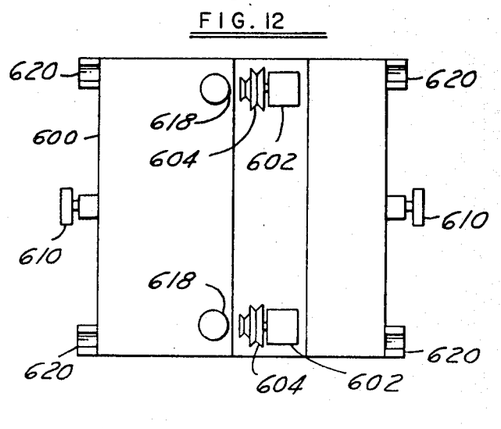
FIG. 12, a bottom view of a modified part carrier.
Figure 13:
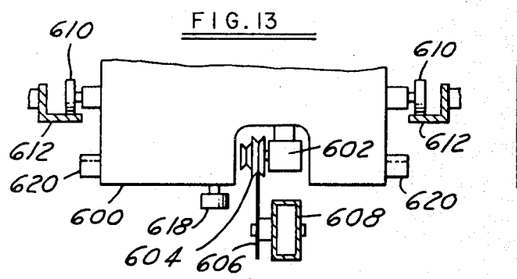
FIG. 13, an end view of the part carrier shown in FIG. 12.
Figure 14:
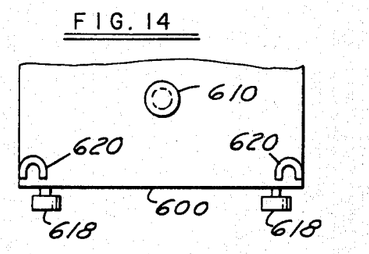
FIG. 14, a side view of the parts carrier of FIG. 12.

An illustrative construction of the underside of a pallet to ride over a fixed track, as opposed to hanging from it, is shown in FIGS. 12-16. It will be understood that the upper surface of the pallet, not shown, is contoured to support and locate the specific workpiece or workpieces for which it was designed. Referring to FIGS. 12-14, a pallet body 600 has mounted on its underside two cartridge type retarder assemblies 602 which support double flanged wheels 604 having multiple rolling diameters. The wheels 604 roll on and are guided by a stationary track 606 (FIG. 13) intermittently supported by a structural support member 608. It will be understood that the track 606 will have a slight downslope in the direction the pallets rolling thereon are intended to travel.

Since the center of gravity of the pallet, with or without the workpiece it carries, will normally be above the contact points between wheels 604 and track 606, the pallet is unstable and will tend to tilt one way or the other about the said contact points. Therefore, two auxiliary wheels 610 are mounted on pallet base 600 to roll on auxiliary tracks 612 which are suitably structurally interconnected with the structure member 608. It will be noted that the contact surfaces of the auxiliary tracks 612 are horizontal so lateral alignment in the horizontal plane can be imprecise. Vertical alignment is also very non-critical, provided only that tracks 612 as shown in FIG. 13 do not both become high enough to lift the pallet off the primary track 606.

In normal construction, both tracks 612 will be mounted some reasonable distance below their theoretical position for simultaneous contact with both wheels 610. It is of no concern that the pallet 600 tilt through some reasonable angle before stability is regained through contact of one wheel 610 or the other with its associated track 612; furthermore, it is of no concern that the pallet tilt back and forth between the two limits established by tracks 612.

Figure 15:
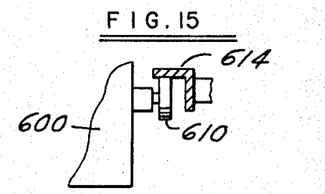
FIG. 15, a sectional view of a modified roller and guide arrangement.

In FIG. 13, the location of auxiliary tracks 612 is under the auxiliary wheels 610. As shown in the inset of FIG. 15, it is also possible to locate the auxiliary tracks 614 above the auxiliary wheels 610, it being understood that both tracks must be above or both tracks below the auxiliary wheels 610. The arrangement of FIG. 15 is advantageous in that it is least susceptible to dirt pickup.

Figure 16:
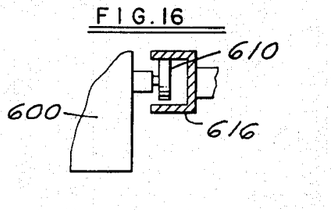
FIG. 16, a sectional view of another modified construction for a pallet guide.

In some areas of pallet travel, especially as pallets move through switches, it is desirable to provide stability through only one or the other of wheels 610. Such an arrangement is shown in FIG. 16. In this case, a single wheel 610 is trapped between an upper and a lower rolling surface as in a channel member 616.

The methods of providing stability, through wheels 610, as illustrated by FIGS. 13, 15 and 16, may be alternated on a given track section to suit specific conditions.

The underside of the pallet body 600 is designed to incorporate longitudinal strips of substantially flat surfaces which are intended to support the pallet in such areas where it operates on roller nest type track, or for support in bucket type pallet elevators. Two center guide rollers 618 are mounted on the underside of the pallet body, operating on vertical axes, to provide lateral guidance on the center channel of a typical roller nest type track.

At the four corners of the pallet body 600 are mounted four adapters 620, which are intended to operate with pins on a specialized type of elevator to be described. These adapters 620 are in effect inverted U type structures suitable for mating with stub pins on an elevator chain. It will be understood that these adapters 620 can also be incorporated in the pallets employing overhead wheels and hangers.

One means of achieving pallet escalation is through a series of closely spaced power driven rolls. Such an escalating power roll conveyor for pallets would obviously require rolls wide enough to accommodate the width of the pallet support surface, and spaced closely enough to provide a continuously stable support for this same surface.

Figures 17, 18:
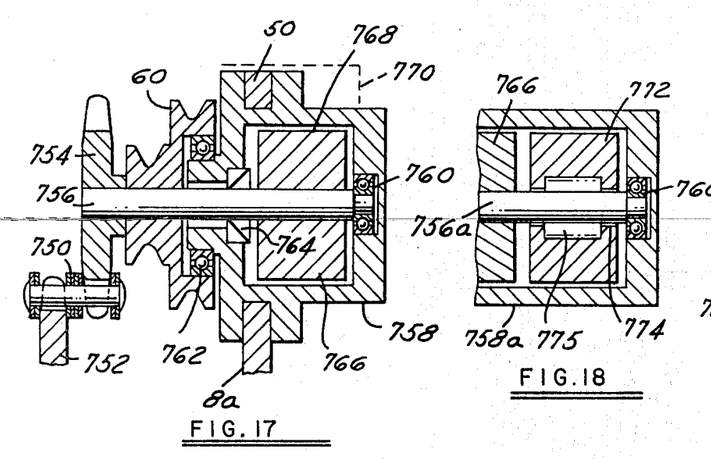
FIG. 17, a sectional view of a chain actuated upslope conveyor.
FIG. 18, a modified structure to provide differential resistance dependent on direction of movement.

Another means of causing a pallet to move along an upslope is shown in FIG. 17, which also illustrates a cylindrical type of retarder as opposed to a disc type of retarder.

A chain strand 750 operates over two sprockets 752. The chain strand 750, therefore, is moved upward at an inclined angle.

Referring to FIG. 17, a sprocket 754 is concentrically mounted to the wheel 60 mounted on shaft 756 of a cylindrical type cartridge retarder, which is comprised of housing 758, bearings 760 and 762, seal 764, and a rotor 766 mounted on the shaft 756. The interspace between the housing 758 and the rotor 766 is filled with a viscous fluid creating a cylindrical shear area 768 between the rotor 766 and housing 758. This cylindrical cartridge retarder also creates a torque proportional to the angular velocity of shaft 756.

The housing 758 is connected to the pallet by a hanger 8a and hook 50 as in FIGS. 5-8; or it may be configured with a mounting boss 770 making it usable with an undersupported pallet as in FIG. 13.

For downslope operation, the pallet rolls on one of the rolling diameters of wheel 60 as previously described. For upslope operation, the track brings the pallet into line with the chain strand 750 and the sprocket 754 finds its way into engagement with the chain 750; it will be noted that a double strand chain is used, with one strand engaging the driving sprockets 752 and the other strand engaged by the pallet sprocket 754, thereby precluding sprocket-to-sprocket interference.

As the chain 750 is driven uphill, it drives the sprocket 754 with it; this sprocket 754 may rotate with respect to the housing 758 with the aforementioned torque speed ratio. The retarder now functions as a slip clutch. It can be seen that as the sprocket 754 is pulled uphill by the chain 750, the pallet rolls backwards with respect to the upward moving chain as determined by the retarder characteristics. The true pallet uphill velocity will be less than that of the chain. As a good approximation, the pallet rolls backward at a relative velocity with respect to the chain as if it were rolling downhill at that same angle of inclination, and in order to achieve a given upward velocity of the pallet, the total chain velocity must be the sum of this relative velocity and the given net upward velocity.

This technique is useful for moderate upward inclination angles comparable to or somewhat greater than the downhill angles at which the pallet rolls on the tracks, and for which the retarder was designed. This is caused by the fact that the retarder torque angular velocity ratio is the same in both directions of rotation. It can be seen that the retarder torque is generated by one direction of rotation of the shaft 756 when the pallet is moving downhill, and generated by the opposite direction of rotation of the shaft 756 when the pallet is being moved uphill by the chain 750.

An illustrative means of building a retarder which has a given torque angular velocity ratio when the shaft is rotated in one direction, and a higher torque angular velocity ratio when the shaft is rotated in the opposite direction, is shown in FIG. 18, which comprises an addended section of FIG. 17.

Referring to FIG. 18, the housing 758a and shaft 756a are lengthened to create additional space adjacent to the rotor 766 mounted on shaft 756a and bearing 760. A secondary rotor 772 is journalled on the shaft 756a through bushings 774. Additionally, the secondary rotor 772 is connected to the shaft 756a through an overrunning clutch 775, such as a sprag clutch or a roller clutch; such clutches are characterized by permitting free rotation of the shaft 756a with respect to the rotor 772 for one direction of shaft 756a rotation with respect to the rotor 772, and locking the rotor 772 to the shaft 756a for the opposite direction of rotation.

It can be seen, therefore, that for one direction of rotation of the shaft 756a, the retarding torque is generated by shear of the fluid between rotor 766 and housing 758a, with rotor 772 disconnected from shaft 756a, while for the other direction of rotation of the shaft 756a, the retarding torque is generated by the shear of the fluid between both rotors 766 and 772 and the housing 758a. Stated another way, the torque angular velocity ratio is greater for one direction of rotation of shaft 756a than for the other direction of its rotation.

This construction can be usefully employed by arranging these characteristics such that only rotor 766 rotates to create the retarding torque during the downhill movement of a pallet, and both rotors 766 and 772 rotate during the uphill pulling of chain 750. The higher torque angular velocity ratio created by the retarder during this uphill pulling permits steeper uphill inclination for a given amount of slippage. It will be understood that this type of double rotor construction is equally applicable to the disc type retarder shown in FIGS. 2 and 5 by using multiple discs, including concentric discs, one of which is attached to the shaft through an overrunning clutch.

Figure 19:
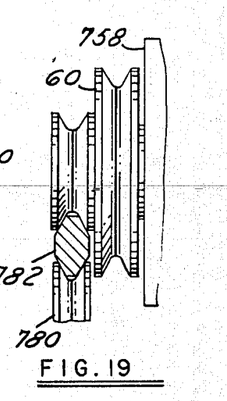
FIG. 19, a belt actuated pallet mover.

Another method for pulling the pallets uphill through the use of the retarder shaft is shown in FIG. 19. A belt 782 is driven by pulleys 780 at an inclined angle. The belt 782, shown in section in FIG. 19, is configured to run over the pulleys 780 and also to engage one of the diameters of wheel 60 on retarder 758. Therefore, as the belt 780 moves uphill, the pallet is also pulled uphill at a lower velocity, due to the slippage of the retarder, analagously to the chain sprocket system of FIG. 17.

The systems for moving pallets uphill at inclined angles through the retarder, with its attendent slippage, is useful in that it is a simple and inexpensive method of lifting pallets through moderate distances while still retaining the non-jamming characteristics of the simple downhill track. Pallets may even form part of a queue on the chain or belt without harmful consequences.

The technique of moving the pallet through the retarder by a chain and sprocket as in FIG. 17 or by a belt on the existing wheel as in FIG. 19, is also applicable for horizontal travel of the pallets. In such a case, the sprockets 752 or pulleys 780 are arranged horizontally. This is useful for situations where manual loading and unloading of the pallets is desired or where some manual operation is to be performed on the workpiece.

Another outgrowth of this technique is that in situations where downhill angles of travel are required that exceed the friction capacity of the wheel on a track of the type shown in FIGS. 5 and 7, it is feasible to incorporate a fixed section of chain to be engaged by the sprocket 754, it being understood that this fixed chain would be mounted parallel to the track and in proper relationship to the track to be engaged by sprocket 754 when wheel 60 is on or slightly above the track. The wheel to track friction would be of no consequence because of the positive chain to sprocket engagement for retardation.

Similarly, in such steeper downhill applications, a fixed section of belt, suitably supported could be used as a track, it being understood that the wheel belt holding friction is greater than the wheel track friction of FIG. 5.

Figure 20:
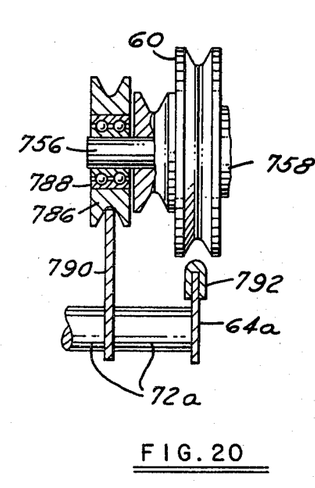
FIG. 20, a secondary track lift to nullify a retarding device.
Figure 21:
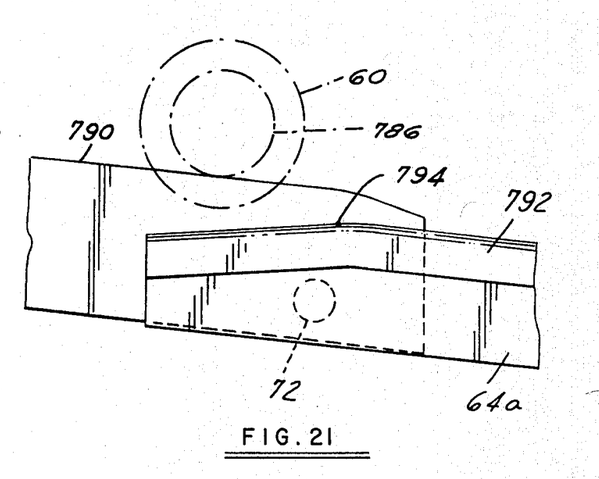
FIG. 21, a side view of the track lift of FIG. 20.

Another useful technique is illustrated in FIGS. 20 and 21. In this instance, a secondary wheel 786 is mounted to the shaft 756 through a bearing 788. This wheel engages an auxiliary track 790 mounted parallel to the modified primary track 64a on modified supports 72a. It can be seen that when a pallet is supported by wheel 786 rolling on auxiliary track 790, the retarding torque of the retarder 758 is effectively cancelled since the wheel 786 is free to rotate on bearing 788. This is a means of turning off the retarding effect as a pallet rolls down some portion of the inclined track. It is usefully employed going around sharp corners which create a natural retarding effect, or for moving away from a stopped position, such as at an escapement, where minimum departure time is desirable, or wherever a non-retarded situation is desirable.

Also illustrated in FIG. 20 is a capping member 792 mounted on the modified primary track 64a. This capping member 792, which may be bolted to track 64a or merely pressed over it, accomplishes two functions; it is an expendable wear member which is easily and economically replaced, and it can create two angular contact lines with the wheel 60, thus increasing the wheel to track effective contact force.

The crossover from a situation in which a pallet is rolling on the unretarded wheel 786 on track 790 to the situation in which that pallet in rolling on the retarded wheel 60 on track 64a with capping member 792 requires no moving parts other than the pallet movement itself as it rolls downhill.

Referring to FIG. 21, wheel 786 is shown rolling on track 790 and rolling downward to the right. As both wheels continue to the right, as a pair, the wheel 60 contacts its track 64a, 792, at a point 794 and rolling thereon is established. Simultaneously, wheel 786 lifts from track 790; track 790 tapers off slightly, then terminates completely.

It can be seen that the capping member 792 is not relevant to this track shift other than to provide a replaceable wear surface on track 64a, i.e., the track shift could also be accomplished with an uncapped track such as shown by 64 in FIG. 5.

It can also be seen that the shift from the retarded rolling of wheel 60 on track 64 to the unretarded rolling of wheel 786 on track 790 can be accomplished by adding another segment of track 790 provided with a tapered entry which is the inverse of the configuration shown in FIG. 21.

We claim:

1. In a conveyor,
   A. a body for carrying load pieces,
   B. a downwardly sloping track means including a first portion to carry an unloaded body and a second portion to carry a loaded body,
   C. two unpowered primary wheels of different diameters mounted on said body for selectively supporting and guiding said body on and with respect to said track means,
   D. retarding means acting between said body and each of said primary wheels to generate a retarding torque substantially proportional to the angular velocity of a said primary wheel,
   E. said first and second portions of said track means being spatially related relative to said primary wheels to cause the smaller diameter primary wheel to ride on said second portion of said track means when a body is loaded, and to cause the large diameter primary wheel to ride on said first portion of said track when a body is not loaded, thereby creating a different ratio of retarding force to body velocity for a body supported on one of said primary wheels than the ratio of retarding force to body velocity for a body supported on the other of said primary wheels.

2. In a conveyor,
   A. a body for carrying load pieces,
   B. downwardly sloping track means including a first portion for carrying an unloaded body and a second portion for carrying a loaded body,
   C. a plurality of unpowered axially spaced primary wheels of different diameters mounted coaxially on a common axis for selectively supporting and guiding said pallet body on and with respect to said track means,
   D. retarding means acting between said body and said primary wheels to generate a retarding torque substantially proportional to the angular velocity of each said primary wheel as it moves on an inclined track,
   E. said first and second portions of said track means being spatially related relative to said primary wheels to cause the smaller of said primary wheels to ride on the second portion of said track means when a body is loaded, and the larger of said primary wheels to ride on the first portion of said track means when a body is unloaded thereby creating a larger ratio of retarding force to body velocity for a loaded body than the retarding force to body velocity for an unloaded body.

3. In a conveyor,
   A. a body for carrying load pieces,
   B. a track means comprising a first downwardly inclined portion for carrying unloaded bodies and a second downwardly inclined portion for carrying load bodies,
   C. a plurality of unpowered axially spaced primary wheels of different diameters mounted coaxially on a common axis for selectively supporting and guiding a body on and with respect to said track surfaces,
   D. retarding means acting between said body and said primary wheels to generate a retarding torque substantially proportional to the angular velocity of each said primary wheel as it moves on an inclined track portion,
   E. said first and second portions of said track means being laterally positioned relative to said primary wheels wherein said smaller of said primary wheels engages the second portion of said track means when a body is carrying a load, and said larger of said primary wheels engages the first portion of said track means when a body is not carrying a load, thereby creating a larger ratio of retarding force to body velocity for a body carrying a load than the ratio of retarding force to body velocity for a body not carrying a load.

4. In a conveyor,
   A. a body for carrying load pieces,
   B. a downwardly sloping track means including a first portion to carry an unloaded body and a second portion to carry a loaded body,
   C. a plurality of unpowered wheels of different diameters mounted for selectively supporting and guiding said body on and with respect to said track means,
   D. retarding means acting between said pallet body and said unpowered wheels to generate a retarding torque substantially proportional to the angular velocity of each said unpowered wheels as it moves on an inclined track surface,
   E. said first and second track portions having different widths to form a wider section and a narrow section, and said unpowered wheels having coaxial large and small diameter portions on each side of the centerplane of the wheels, the large diameter portions being spaced to engage the wider track sections for carrying unloaded bodies and the small diameter portions being spaced to engage the narrow track sections for carrying loaded bodies thereby creating a larger ratio of retarding force to body velocity for a body carrying a load than the ratio of retarding force to body velocity for a body not carrying a load.

* * * * *